(12) United States Patent
Kashihara et al.

(10) Patent No.: US 7,391,136 B2
(45) Date of Patent: Jun. 24, 2008

(54) ELECTRIC ROTATING MACHINE

(75) Inventors: Toshiaki Kashihara, Tokyo (JP);
Wakaki Miyaji, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 272 days.

(21) Appl. No.: 10/547,390

(22) PCT Filed: Mar. 25, 2004

(86) PCT No.: PCT/JP2004/004179

§ 371 (c)(1),
(2), (4) Date: Aug. 31, 2005

(87) PCT Pub. No.: WO2005/093929

PCT Pub. Date: Oct. 6, 2005

(65) Prior Publication Data

US 2006/0163952 A1    Jul. 27, 2006

(51) Int. Cl.
*H02K 1/04* (2006.01)
(52) U.S. Cl. ............................. 310/43; 310/52
(58) Field of Classification Search ............... 310/43, 310/52, 58, 64
See application file for complete search history.

(56) References Cited

U.S. PATENT DOCUMENTS 6,191,508 B1 * 2/2001 Aoki et al. .................. 310/45
6,204,586 B1 * 3/2001 Umeda et al. ............... 310/179

FOREIGN PATENT DOCUMENTS

| JP | 2000-050573 | A | | 2/2000 |
| JP | 2001-211621 | A | | 8/2001 |
| JP | 2002-125337 | A | | 4/2002 |
| JP | 2002-218687 | | * | 8/2002 |
| JP | 2003-259613 | A | | 9/2003 |

* cited by examiner

*Primary Examiner*—Dang Le
*Assistant Examiner*—Nguyen Hanh
(74) *Attorney, Agent, or Firm*—Sughrue Mion, PLLC (57) ABSTRACT

An in-slot conductor part of a stator winding of a rotary electric machine has multiple in-slot conductors disposed in multiple slots. In each of the multiple slots a plurality of the in-slot conductors are disposed in a line in the depth direction of the slot, in the coil end parts each of the multiple coil end conductors has a root part led out through a slot opening at one of the end faces of a stator core in substantially the same direction as the extension direction of the in-slot conductors and a connecting part disposed farther from the end face of the stator core than this root part and bent so as to form a bridge between two root parts. At each of these slot openings, the root parts continuous with the in-slot conductors inserted into the slot are disposed in a line in the depth direction of the slot and form a root part line, on either side of these root part lines are formed cooling passages extending along said one of the end faces in the depth direction of the slot, on the outer side of the root part lines an end cylindrical part formed by overlapping connecting parts is formed, and on this end cylindrical part and covering at least the outer face thereof is disposed an insulating member.

10 Claims, 6 Drawing Sheets

ELECTRIC ROTATING MACHINE

TECHNICAL FIELD

This invention relates to a rotary electric machine that can be applied for example to an A.C. generator mounted in a car for charging a car battery and supplying electrical power to electrical loads in the car, and the invention particularly relates to the coil end parts of a stator winding of a rotary electric machine and the improvement of a cooling structure for them.

BACKGROUND ART

As a rotary electric machine of this kind, for example JP-A-2000-50573 (Related Art 1) is known. In a rotary electric machine shown in this Related Art 1, a plurality of in-slot conductors are disposed in slots in a stator core, but these in-slot conductors are constructed as a bundled group, and consequently, even at the coil end parts, this bundled group is bent. In Related Art 1, root gap parts are formed between the bundled group in the coil end parts and the end faces of the stator core, and the structure is such that the coil end parts are cooled by a cooling draft passing through these root gap parts; however, because they are in the form of a bundled group, there has been the problem that although a number of conductors positioned at the surface can be cooled easily by the cooling draft, a number of conductors positioned on the inside are difficult to cool.

And as a rotary electric machine of this kind, for example JP-A-2003-259613 (Related Art 2) is also known. In a rotary electric machine shown in this Related Art 2, a plurality of U-shaped electrical conductors are used, these multiple U-shaped electrical conductors are inserted into slots of a stator core, and connection is carried out at coil end parts. In each slot, plurality of in-slot conductors line up in a row and a conductor line is formed. The conductors of the coil end parts have root parts led out from slot openings at the end faces of the stator core and bent parts bent from these root parts, and a space remaining after an auxiliary member used for bending the bent parts is removed is utilized as a cooling passage. In this Related Art 2, bent parts of two U-shaped conductors are connected to each other in the coil end parts, and these connected bent parts are disposed overlapping, but to connect each of these bent parts a complicated operation is necessary, and no particular consideration is given to cooling of the parts where the bent parts overlap, and there have been problems in the cooling in the parts where these multiple bent parts overlap.

This invention provides an improved rotary electric machine for resolving these problems in which the coil end parts can be cooled more efficiently.

DISCLOSURE OF THE INVENTION

A rotary electric machine according to the invention includes a rotor, a stator core and a stator winding. The rotor rotates together with a rotating shaft, disposed inside a housing. The stator core is fixed to the housing and has an inner circumferential face facing the circumferential periphery of the rotor across a radial air gap, two opposite end faces, and multiple slots formed at a predetermined pitch around the inner circumferential face. The stator winding has an in-slot conductor part disposed in the multiple slots and two coil end parts disposed on the outer sides of the end faces.

In the rotary electric machine, the in-slot conductor part includes multiple in-slot conductors disposed in the multiple slots and each of the coil end parts includes multiple coil end conductors continuously connecting together the in-slot conductors disposed in different slots on the outer sides of the end faces so that the in-slot conductors are connected continuously around the rotating shaft.

In each of the multiple slots a plurality of the in-slot conductors are disposed in a line in the depth direction of the slot, in at least one of the two coil end parts each of the coil end conductors has a root part led out through a slot opening at one of the end faces in substantially the same direction as the extension direction of the in-slot conductors and a connecting part further from said one of the end faces than this root part and bent so as to form a bridge between two root parts.

At said at least one of the end faces, at each of the slot openings, the root parts continuous with the in-slot conductors inserted into the slot are disposed in a line in the depth direction of the slot and form a root part line, on either side of each of these root part lines is formed a cooling passage extending along said at least one of the end faces in the depth direction of the slot, on the outer side of the root part lines an end cylindrical part formed by overlapping connecting parts is formed, and on this end cylindrical part and covering at least the outer face thereof is disposed an electrically insulating member.

In the rotary electric machine of this invention, because the coil end parts continuously connect together the in-slot conductors disposed in different slots on the outer sides of the end faces of the stator core so that the in-slot conductors are connected continuously around the rotating shaft, the shapes of the coil end parts can be simplified. And because at least one of the end faces of the stator core, at each slot opening, the root parts continuous with the in-slot conductors inserted into the slot are disposed in a line in the depth direction of the slot and form a root part line and on either side of this root part line is formed a cooling passage extending along said at least one of the end faces in the depth direction of the slot, it is possible to cool the coil end part effectively by means of a cooling draft passing through these cooling passages, and because also end cylindrical parts constituted by overlapping connecting parts are formed on the outer side of the root part lines and an insulating member is disposed covering at least the outer face of the end cylindrical part, through this insulating member the multiple connecting parts inside it can also be cooled effectively.

BEST MODES FOR CARRYING OUT THE INVENTION

A number of embodiments of rotary electric machines according to the invention will now be described with reference to the drawings.

First Embodiment

Figure 1:
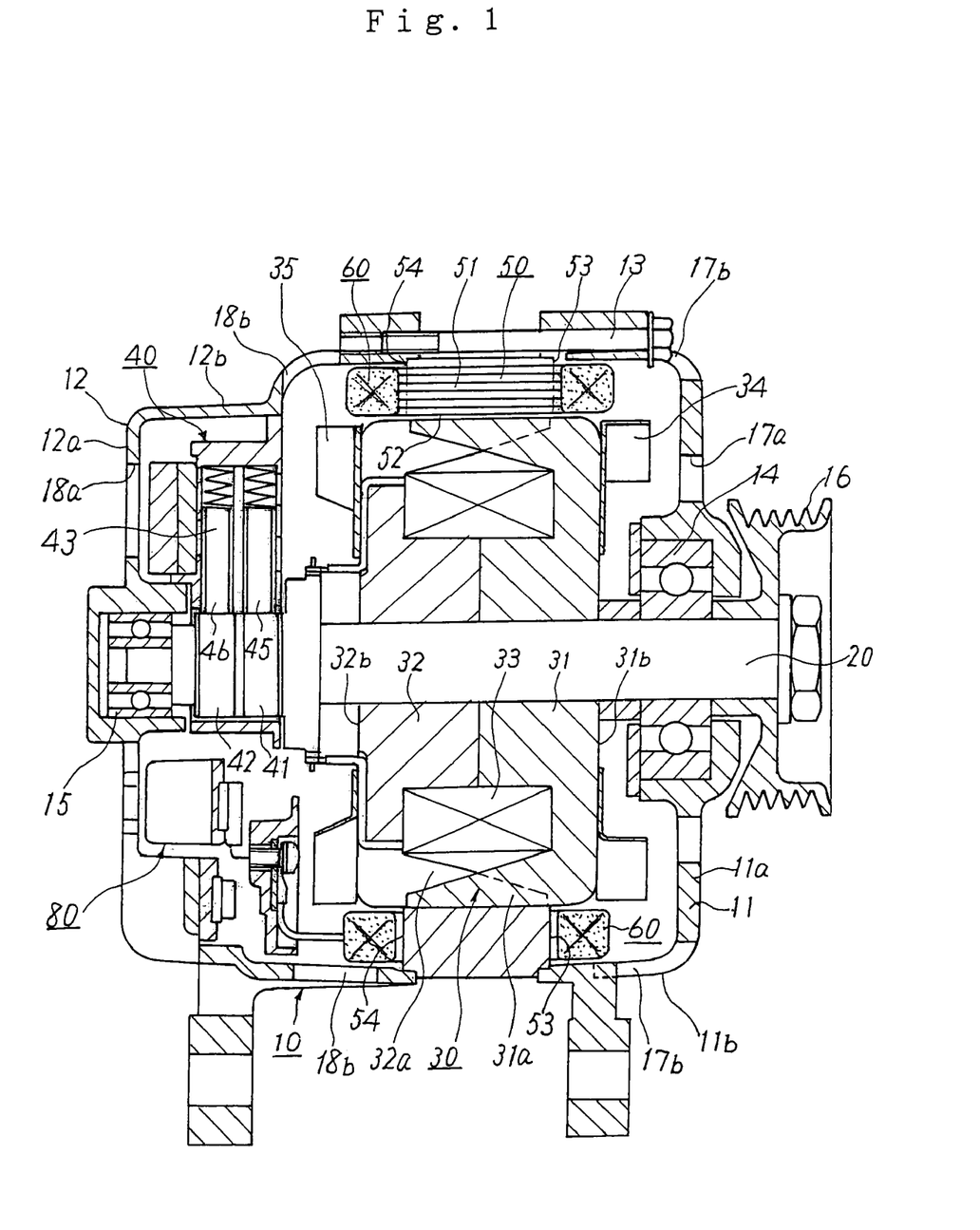
FIG. 1 is a sectional side view showing a first embodiment of a rotary electric machine according to the invention.
Figure 2:
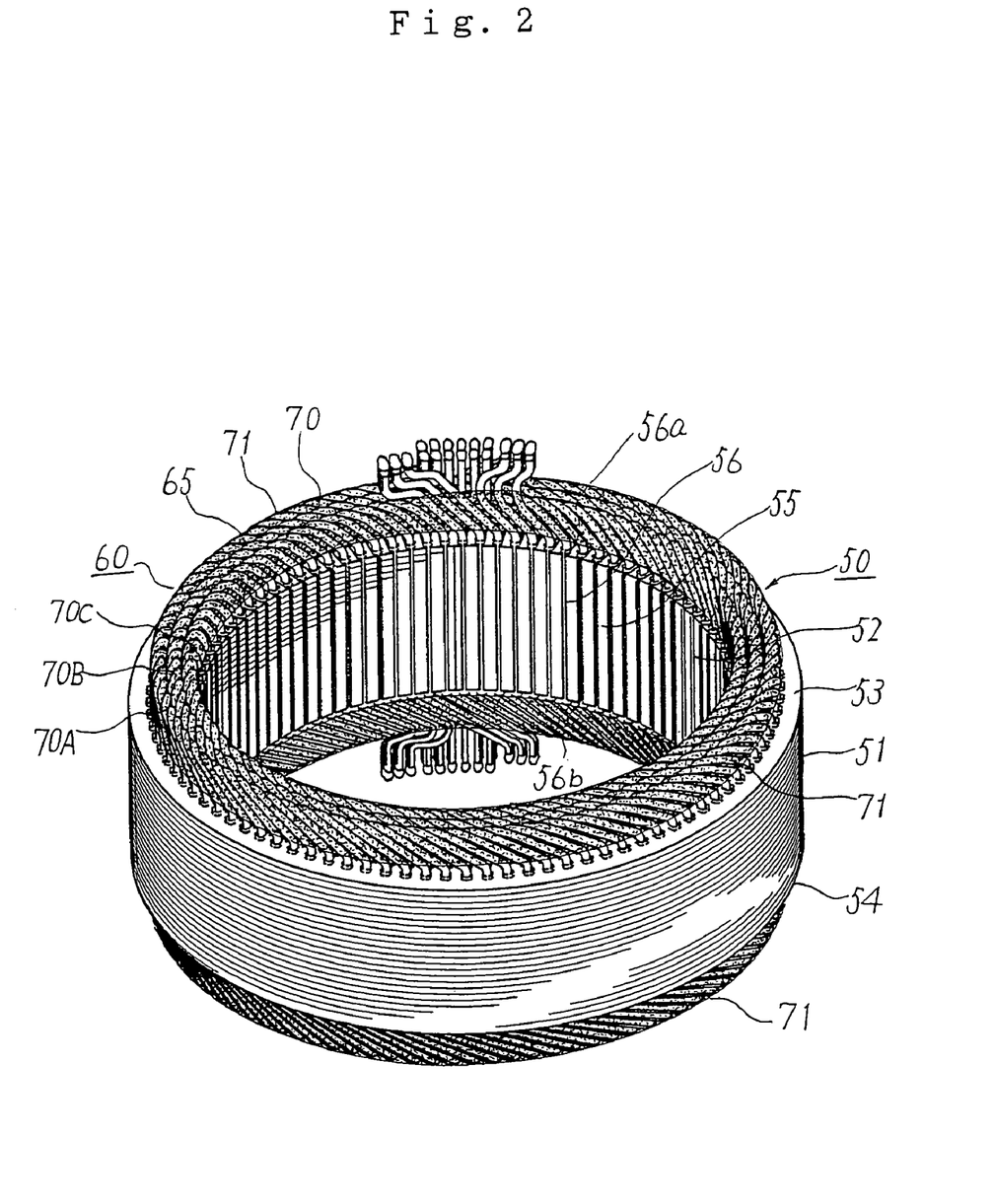
FIG. 2 is a perspective view showing a stator in the first embodiment.
Figure 3:
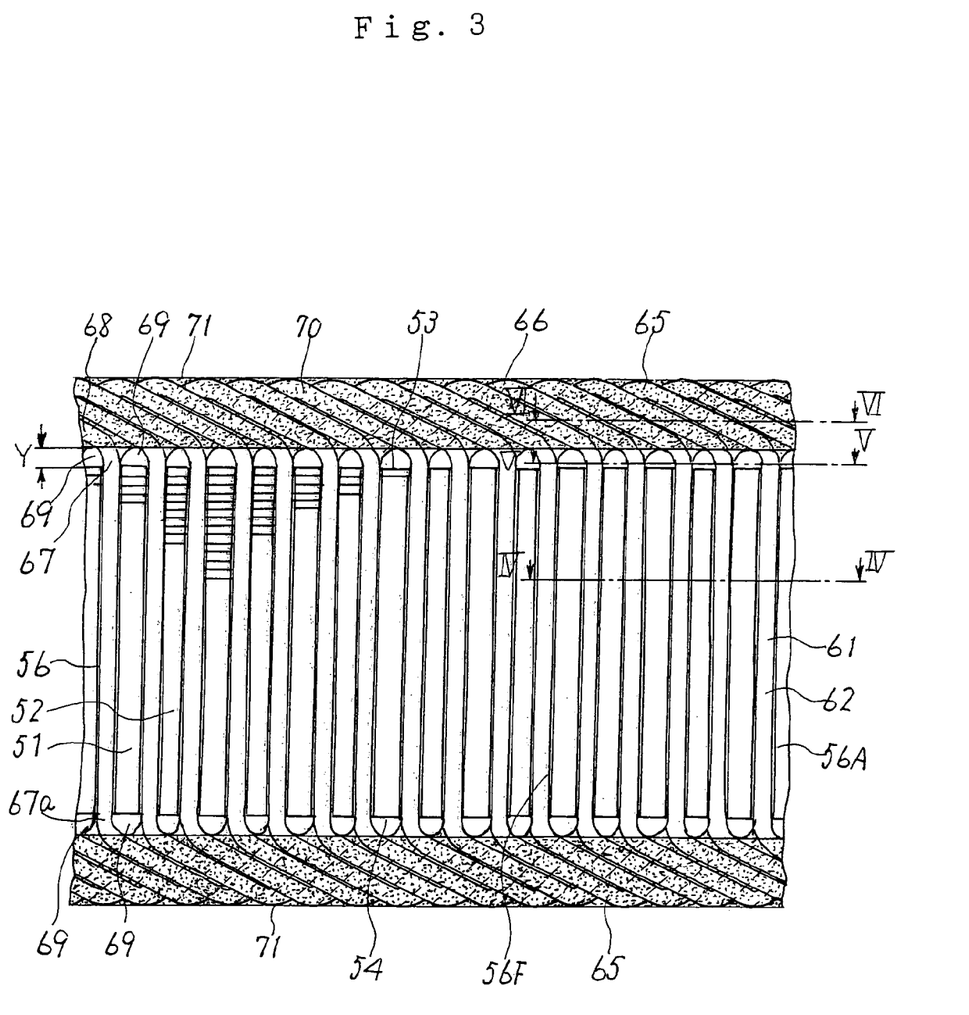
FIG. 3 is a detail view of a part of the stator in the first preferred embodiment seen from its inner side.
Figure 4:
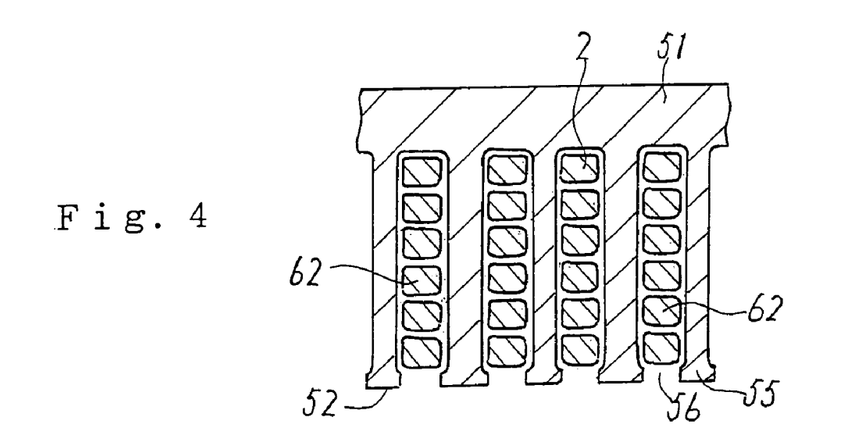
FIG. 4 is a sectional view on the line IV-IV in FIG. 3.
Figure 5:
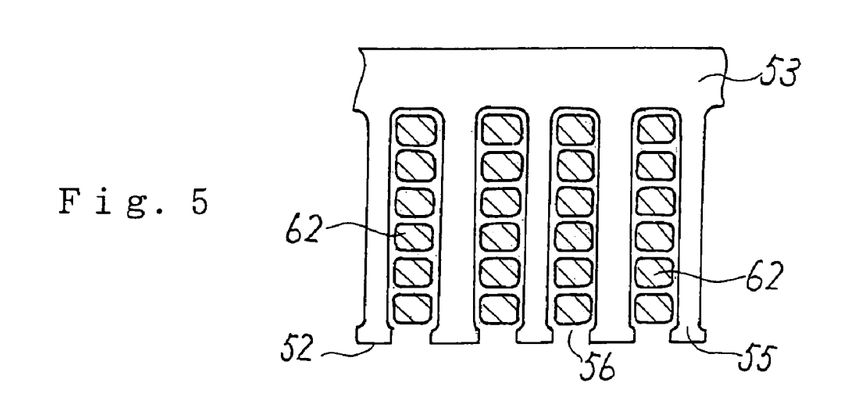
FIG. 5 is a sectional view on the line V-V in FIG. 3.
Figure 6:
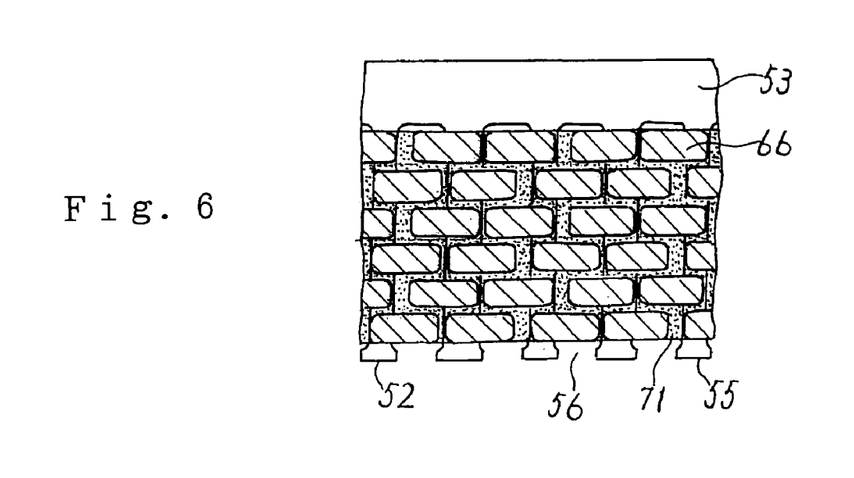
FIG. 6 is a sectional view on the line VI-VI in FIG. 3.

A first embodiment of a rotary electric machine according to the invention will be described with reference to FIG. 1 through FIG. 6. FIG. 1 is a sectional side view of this first embodiment, FIG. 2 is a perspective view of a stator in the first embodiment, FIG. 3 is a detail view of a part of this stator seen from its inner side, and FIG. 4, FIG. 5, FIG. 6 are respectively sectional views on the lines IV-IV, V-V, VI-VI in FIG. 3.

This A.C. generator is an A.C. generator to be installed in a car. This is a revolving-field type A.C. generator and is driven by an engine mounted in a car and charges a battery mounted in the car and supplies electrical power to various loads of the car.

The A.C. generator of this first embodiment includes a housing 10, a rotating shaft 20, a rotor 30, a power supply device 40 for supplying electrical power to the rotor, a stator 50, and a rectifier 80. The housing 10 is made up of a pair of opposing brackets 11, 12. The bracket 11 is called a front bracket and the bracket 12 a rear bracket. These brackets 11, 12 are both substantially cup-shaped, and they are disposed with their open ends facing each other.

The front bracket 11 has an end wall 12a and a circumferential wall 11b, and the rear bracket 12 also has an end wall 11a and a circumferential wall 12b. The end walls 11a, 12a are flat walls substantially perpendicular to the rotating shaft 20, and the circumferential walls 11b, 12b of the brackets 11, 12 surround the rotating shaft 20. A stator 50 is sandwiched between the circumferential wall 11b of the front bracket 11 and the circumferential wall 12b of the rear bracket 12, and this stator 50 is held between the brackets 11, 12 by connecting bolts 13 connecting the brackets 11, 12 together.

The rotating shaft 20 is rotatably supported by ball bearings 14, 15 at the centers of the end walls 11a, 12a of the brackets 11, 12. The rotating shaft 20 extends through the center of the bracket 11 to outside the bracket 11 and has a pulley 16 attached to it outside the bracket 11. This pulley 16 is connected by a belt (not shown) to the engine of the car, and the rotating shaft 20 is driven to rotate by this engine.

Plural ventilation openings 17a, 17b, 18a, 18b are formed in the brackets 11 and 12. Plural ventilation holes 17a are formed in the end wall 11a of the bracket 11 and plural ventilation holes 17b in the circumferential wall 11b, and plural ventilation holes 18a are formed in the end wall 11a of the bracket 12 and plural ventilation holes 18b in the circumferential wall 12b.

The rotor 30 is mounted on a central part of the rotating shaft 20. This rotor 30 is a field rotor and has a pair of opposing field cores 31, 32 and a field coil 33. The field cores 31, 32 have at their respective peripheries projecting poles 31a, 32a projecting toward those of the other, and the field coil 33 is disposed around the inside of these projecting poles 31a, 32a. The field core 31 has an end face 31b and the field core 32 has an end face 32b, and these end faces 31b, 32b face away from each other. A front side cooling fan 34 is attached to the periphery of the end face 31b of the field core 31, and a rear-side cooling fan 35 is attached to periphery of the end face 32b of the field core 32. These cooling fans 34, 35 rotate together with the rotating shaft 20 and each create a cooling draft. These cooling drafts are guided through the ventilation holes 17a and 18a into the inside of the housing 10 and are exhausted through the ventilation holes 17b and 18b. The field coil 33, the power supply device 40, the stator 50 and the rectifier 80 are cooled by these cooling drafts.

The power supply device 40 for the rotor and the rectifier 80 are disposed inside the rear bracket 12. The power supply device 40 is a device for supplying electricity to the field coil 33, and includes a pair of slip rings 41, 42 and a brushes device 43 to go with these. The slip rings 41, 42 are connected to the field coil 33 and are attached to the outer surface of the rotating shaft 20 and rotate along with the rotating shaft 20. The brushes device 43 has brushes 45, 46 in contact with the slip rings 41, 42, and these brushes 45, 46 are pressed against the outer faces of the slip rings 41, 42 by brush springs. The rectified output of the rectifier 80 is supplied to the brushes 45, 46 and excites the field coil 33.

The stator 50 is also shown in perspective view in FIG. 2. This stator 50 has a substantially cylindrical stator core 51 and a stator winding 60 wound on this stator core 51. In this stator 50 the stator core 51 is made by for example stacking steel plates such as silicon steel plates in the direction of the rotating shaft 20.

The stator core 51 has an inner face 52 surrounding the outer face of the rotor 30 and a pair of opposite end faces 53, 54. The end face 53 faces the end wall 11a of the front bracket 11, and the end face 54 faces the end wall 12a of the rear bracket 12. The inner face 52 of the stator core 51 faces the outer face of the rotor 30 across a very small air gap.

On the inner face of the stator core 51, as shown particularly in FIG. 3, FIG. 4, FIG. 5 and FIG. 6, multiple teeth 55 are formed with a uniform spacing around the inner face 52, and slots 56 are formed between the adjacent teeth 55. The number of these slots 56 will be written N. Because multiple teeth 55 are formed with a uniform spacing, N slots 56 are also formed with a uniform spacing around the inner face 52. The N slots 56 all have a predetermined length extending parallel with the axis of the rotating shaft 20 between the end face 53 and the end face 54, and have a predetermined depth in the radial direction of the rotating shaft 20. The N slots 56 each have a slot opening 56a at the end face 53 and a slot opening 56b at the end face 54.

The stator winding 60, in this first embodiment, is constructed as an A.C. generation winding. The stator winding 60 is wound continuously around the inner side of the stator core 51 using for example a cross-sectionally rectangular flat conductor. This stator winding 60 has an in-slot winding part 61 and coil end parts 65. The in-slot winding part 61 is made up of multiple in-slot conductors 62 disposed in the multiple slots 56. In this first embodiment, the cross-sectionally rectangular conductor is used for the in-slot conductors 62 disposed in the slots 56. In each of the slots 56 the number of in-slot conductors 62 is six, and the six in-slot conductors 62 are disposed in a single line in the depth direction of the slot 56, that is, in the radial direction of the rotating shaft 20. The six in-slot conductors 62 in any one slot 56A among the N slots 56 are wound continuously with for example the in-slot conductors 62 in another slot 56F six slots away from the slot 56A in the circumferential direction, and the in-slot conductors 62 in these slots 56A and 56F are electrically connected to each other. The six in-slot conductors 62 in this slot 56A and the six in-slot conductors 62 in the slot 56F are linked and electrically connected by six coil end conductors 66 of a coil end part 65. Because six coil end conductors 66 are formed continuously with the six in-slot conductors 62 in each of two slots 56 six apart, on the stator core 51 in which N slots 56 are formed, (N/2)×6 coil end conductors 66 overlap each other while being staggered in turn in the circumferential direction by the slot pitch, whereby a coil end 65 is formed. The six in-slot conductors 62 in each of the N slots 56, repeating the form of connecting via coil end conductors 66 to other in-slot conductors 62, are formed continuously with others around a range of approximately one circumference of the inside of the stator core 51. By this continuous formation of the stator winding 60, the stator winding 60 can be formed easily.

As shown in FIG. 3, the coil end conductors 66 each include two root parts 67 and one connecting part 68 bent over so as to form a bridge between these two root parts 67.

Whereas the root parts 67 are of the same cross-sectionally rectangular shape as the in-slot conductors 62, the connecting parts 68 are deformed and made substantially circular in cross-section. One of the root parts 67 is formed continuously with one of the in-slot conductors 62 disposed in any slot 56A among the slots 56, and the other root part 67 is formed continuously with one of the in-slot conductors 62 disposed in another slot 56F six slots away from the slot 56A. The connecting part 68 is continuous with these root parts 67 and bent into a circular arc shape so as to form a bridge between these root parts 67.

Each of the root parts 67 is formed continuously with an in-slot conductor 62 and is led out through a slot opening 56a, 56b in a straight line in the extension direction of the corresponding in-slot conductor 62. This root part 67 projects by a predetermined length Y from the end face 53, 54 of the stator core 51 as shown in FIG. 3. This projecting length Y is secured by setting the dimension of the straight-line part of each winding turn of the stator winding 60 by adding together the in-slot conductor 62 and the projecting lengths Y of the root parts 67 at the ends thereof in a step of winding the stator winding 60 before the stator winding 60 is inserted into the slots 56.

This kind of winding method of the stator winding 60 is disclosed in International Application PCT/JP2004/00736 submitted on Jan. the 28th 2004, or is disclosed in Japanese Patent Publication No. 2002-259136 submitted on Sep. the 4th 2002. The invention of this Japanese Patent Publication No. 2002-259136 was submitted in America as U.S. patent application Ser. No. 10/359,095 on Feb. the 6th 2003, was submitted in Germany as German Patent Application No. 10325617.2 on Jun. the 5th 2003, and was submitted in France as French Patent Application No. 0350297 on Jul. the 4th 2003. The applicants or patent assignees of these applications are the same as the applicants of the present application.

Because six in-slot conductors 62 are disposed in each of the slots 56 in the depth direction, at the openings 56a, 56b of each of the slots 56 a root part line 67a made up of six root parts 67 projecting by the predetermined length Y from the in-slot conductors 62 and lined up in the depth direction of the slot 56 is formed. A cooling passage 69 is formed on either side of this root part line 67a. This cooling passage 69 is formed along the end face 53, 54 of the stator core 51 and extends in the depth direction of the slots 56, the radial direction of the rotating shaft 20.

As shown in FIG. 2 and FIG. 3, an end cylinder 70 formed by multiple connecting parts 68 overlapping each other is formed at each coil end 65 of the stator winding 60. This end cylinder 70 is a cylindrical part formed by congregation of the connecting parts 68 of the multiple coil end conductors 66. This end cylinder 70 includes three cylindrical parts 70A, 70B and 70C formed in substantially concentrically circles. Because each of the coil end conductors 66 connects in-slot conductors 62 in two slots 56 six slots apart, the result is that a total of six coil end conductors 66 are disposed between every two slots 56 six slots apart, and these six coil end conductors 66 take the form of three layers forming the three cylindrical parts 70A, 70B and 70C, and are disposed along the annular end face 53, 54 of the stator core 51, staggered by 1 slot pitch.

In this first embodiment, the end cylinder 70 is covered by an insulating member 71. The end cylinder 70 is made up not of the root parts 67 but of the multiple connecting parts 68 positioned outward of these root parts 67, and the insulating member 71 also is provided so that it excludes the root parts 67 of the coil end 65 and covers only the multiple connecting parts 68 thereof. Because this insulating member 71 is not formed on the root parts 67 of the coil end 65, the root parts 67 and the root part lines 67a are not covered by the insulating member 71 and are exposed from the insulating member 71. Therefore, there is the result that the cooling passages 69 are provided between the end face 53, 54 of the stator core 51 and this insulating member 71.

This insulating member 71 is made of a material made by mixing a ceramic filler for increasing thermal conductivity with a resin insulating material such as epoxy resin. This insulating member 71 covers the outer faces of the cylindrical parts 70A, 70B and 70C of the end cylinder 70 and the insulating member 71 is also packed into the gaps between the multiple connecting parts 68 constituting the cylindrical parts 70A, 70B and 70C. As a result of the insulating member 71 containing a ceramic filler for increasing thermal conductivity, the multiple connecting parts 68 constituting the end cylinder 70 are more efficiently cooled. As the ceramic filler mixed into the insulating member 71, alumina or silicon oxide is used.

Air gaps of a size substantially uniform in the circumferential direction are formed on the inner sides of the insulating members 71 on the end cylinder 70, between them and the cooling fans 34, 35 mounted on the field cores 31, 32, surrounding the cooling fans 34, 35. Multiple ventilation openings 17a, 17b, 18a, 18b are formed in the brackets 11, 12. In particular, the ventilation holes 17b, 18b are formed in positions outward of the stator winding 60 and in positions facing the outer circumferences of the coil end parts 65 thereof. With the rotation of the rotating shaft 20, the cooling fans 34, 35 disposed on the field cores 31, 32 create cooling drafts that head through the ventilation holes 17a, 18a toward the ventilation holes 17b, 18b, and these cooling drafts flow from the inner sides of the insulating members 71 covering the end cylinder 70 in the coil end parts 65 to their outer sides and are exhausted through the ventilation holes 17b, 18b.

Specifically, these cooling drafts strike the inner sides of the insulating members 71 and from there pass through the cooling passages 69 on the stator core 51 sides of the insulating members 71 and through air gaps on the bracket 11, 12 end wall 11a, 12a sides of the insulating members 71, and flow to the ventilation holes 17b, 19b. These cooling drafts cool the root parts 67 of the coil end conductors 66 directly and cool the connecting parts 68 by way of the insulating members 71. Because the root parts 67 are arranged in lines along the root part lines 67a forming the cooling passages 69, all of the root parts 67 are cooled efficiently. And, because the insulating members 71 form smooth surfaces for the cooling drafts on the outer faces of the end cylinder 70, and form air gaps around the cooling fans 34, 35 of a substantially uniform size in the circumferential direction thereof, and also contain a ceramic filler that increases their thermal conductivity, as a whole they are substantially evenly efficiently cooled, and as a result the connecting parts 68 are also cooled efficiently. And, because the end cylinder 70 is covered by the insulating members 71, efficient cooling can be carried out without the cooling drafts flowing into the end cylinder 70 where the connecting parts 68 are stacked and causing draft noise and draft damage.

Second Embodiment

Figure 7:
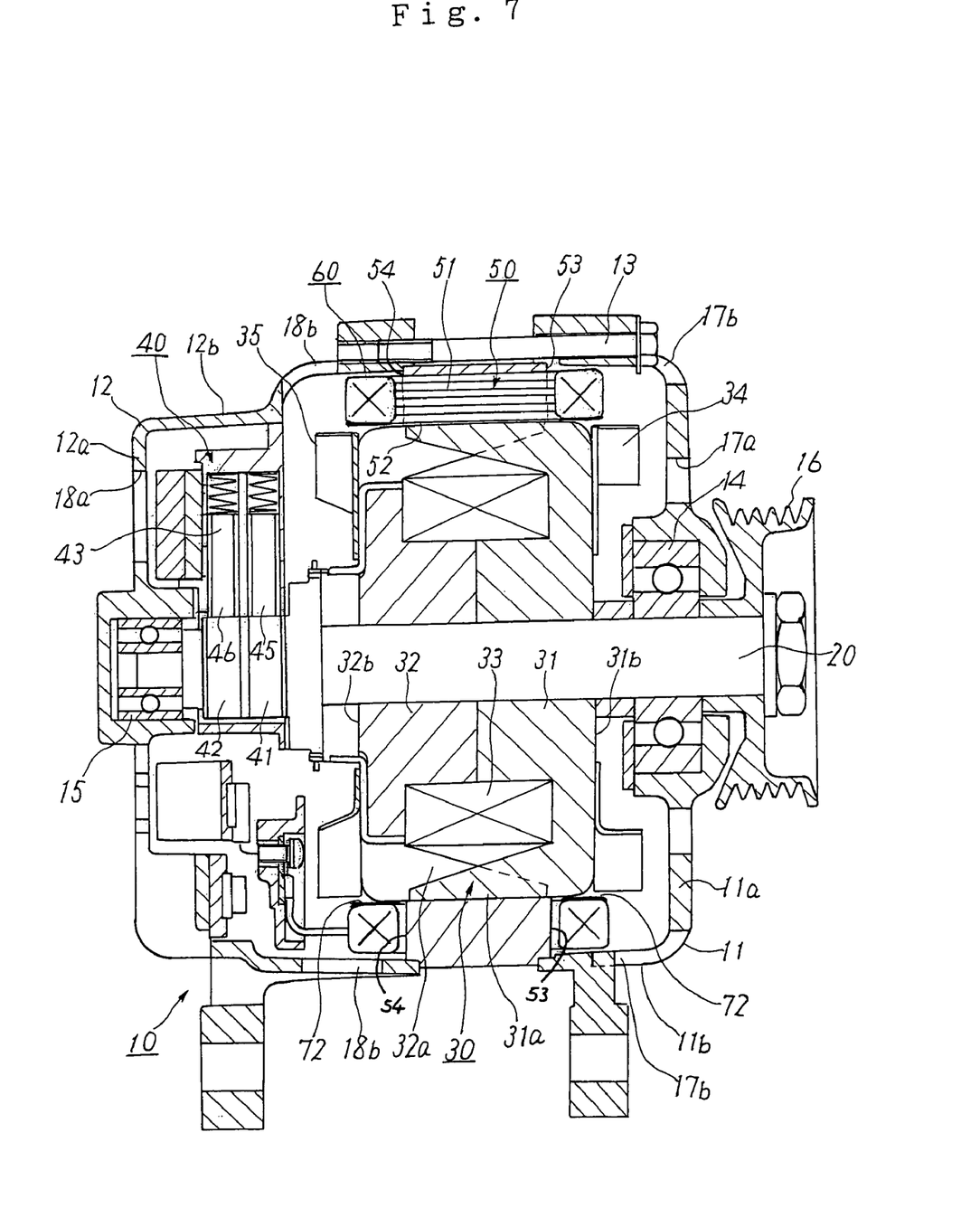
FIG. 7 is a sectional side view showing a second embodiment of a rotary electric machine according to the invention.
Figure 8:
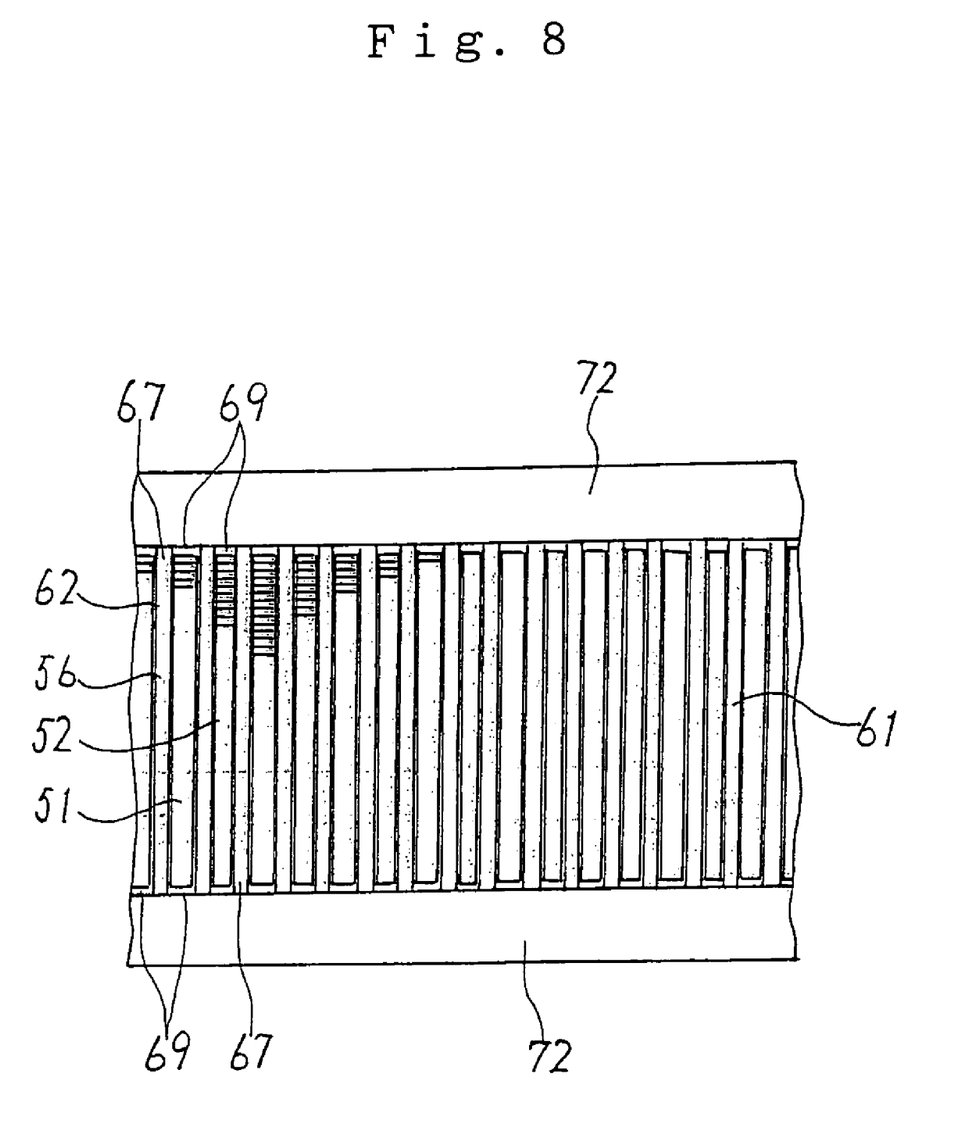
FIG. 8 is a detail view of a part of a stator in the second embodiment seen from its inner side.

Next, a second embodiment of a rotary electric machine according to the invention will be described, with reference to FIG. 7 and FIG. 8. FIG. 7 is a sectional side view of the second embodiment, and FIG. 8 is a detail view of a part of a stator of the second embodiment seen from its inner side.

Whereas in the first embodiment the outer faces of the end cylinder 70 of to lie stator winding 60 were covered with insulating members 71, and the insulating members 71 were also packed in the gaps between the multiple connecting parts 68 of the coil end conductors 66 constituting the end cylinder 70, in this second embodiment insulating sheets 72 are used instead of the insulating members 71 of the first embodiment.

As shown in FIG. 7, these insulating sheets 72 are disposed so as to cover the inner sides of the end cylinder 70, and form between themselves and the cooling fans 34, 35 an air gap substantially uniform in the circumferential direction. And as shown in FIG. 8, the insulating sheets 72 cover the entire inner sides of the end cylinder 70 without covering the root parts 67 and the root part lines 67a, and are fixed by adhesion to the inner sides of the end cylinder 70.

The insulating sheets 72 are made for example by mixing glass fiber as a ceramic filler for increasing thermal conductivity with an epoxy resin sheet, and like the insulating members 71 of the first embodiment they perform efficient cooling of the multiple connecting parts 68 of the end cylinder 70. And because the insulating sheets 72 can be fixed to the end cylinder 70 easily by adhesion or the like, compared to the first embodiment the task of hardening the resin of the insulating members 71 can be eliminated, and because the insulating sheets 72 prevent cooling drafts from flowing into the inside of the end cylinder 70, noise and draft damage caused by cooling drafts flowing into the connecting parts 68 of the end cylinder 70 can be reduced.

The rest of the construction is the same as that of the first preferred embodiment, and with this second embodiment the same effects as those of the first embodiment can be obtained.

INDUSTRIAL APPLICABILITY

A rotary electric machine according to this invention can be used as a rotary electric machine such as for example an A.C. generator mounted in an automotive vehicle.

The invention claimed is:

1. A rotary electric machine, comprising:
   a rotor, which rotates together with a rotating shaft, disposed inside a housing;
   a stator core fixed to the housing and having an inner circumferential face facing the circumferential periphery of the rotor across a radial air gap, two opposite end faces, and multiple slots formed at a predetermined pitch around the inner circumferential face; and
   a stator winding having an in-slot conductor part disposed in the multiple slots and two coil end parts disposed on the outer sides of the end faces,
   wherein:
   the in-slot conductor part includes multiple in-slot conductors disposed in the multiple slots and each of the coil end parts includes multiple coil end conductors continuously connecting together the in-slot conductors disposed in different slots on the outer sides of the end faces so that the in-slot conductors are connected continuously around the rotating shaft,
   in each of the multiple slots a plurality of the in-slot conductors are disposed in a line in the depth direction of the slot, in at least one of the two coil end parts each of the coil end conductors has a root part led out through a slot opening at one of the end faces in substantially the same direction as the extension direction of the in-slot conductors and a connecting part farther from said one of the end faces than the root part and bent so as to form a bridge between two root parts,
   at said one of the end faces, at each of the slot openings, the root parts continuous with the in-slot conductors inserted into the slot are disposed in a line in the depth direction of the slot and form a root part line, on either side of each of the root part lines is formed a cooling passage extending along said one of the end faces in the depth direction of the slot,
   on the outer side of the root part lines the connecting parts of the coil end conductors overlap forming an end cylindrical part, on the end cylindrical part an insulating member is disposed to cover at least the outer surface of the cylindrical end part,
   each of the root parts of the coil end conductors project by a predetermined length from said one of the end faces, and
   the insulating member covers the connecting parts of the end conductors but does not cover the root parts so that the cooling passages are formed between said one of the end faces and the insulating member with a width corresponding to the predetermined length.

2. The rotary electric machine according to claim 1, wherein the insulating member is also packed into gaps between the connecting parts constituting the end cylindrical part.

3. The rotary electric machine according to claim 2, wherein the insulating member has mixed therein alumina or silicon oxide as a filler for increasing its thermal conductivity.

4. The rotary electric machine according to claim 1, wherein the insulating member comprises an insulating sheet covering an outer face of the end cylindrical part.

5. The rotary electric machine according to claim 4, wherein the insulating sheet has mixed therein a glass fiber as a filler for increasing its thermal conductivity.

6. The rotary electric machine according to claim 1, wherein plural ventilation holes are formed in the housing, facing the outer circumferential sides of the coil end parts.

7. The rotary electric machine according to claim 1, wherein on at least one end part of the rotor a cooling fan positioned around the inner circumference of the insulating member is disposed so as to rotate together with the rotor, and the cooling fan effects ventilation of the cooling passages.

8. The rotary electric machine according to claim 7, wherein an air gap between the cooling fan and the insulating member is of a substantially uniform size in the circumferential direction.

9. The rotary electric machine according to claim 1, wherein each of the in-slot conductors has a substantially rectangular cross-section and the connecting parts has a substantially circular cross-section.

10. The rotary electric machine according to claim 9, wherein the in-slot conductors and the connecting pans, together with the root pads, are made of insulator-covered conductors.

* * * * *